Dec. 3, 1968

J. C. MILLER ET AL 3,414,897

DISPLAY DEVICE

Filed Jan. 7, 1966

INVENTORS
JAMES C. MILLER &
CHARLES M. WINE
BY
John V. Regan
Attorney

United States Patent Office 3,414,897
Patented Dec. 3, 1968

3,414,897
DISPLAY DEVICE
James C. Miller, Pennington, and Charles M. Wine, Princeton, N.J., assignor to Radio Corporation of America, a corporation of Delaware
Filed Jan. 7, 1966, Ser. No. 519,205
10 Claims. (Cl. 340—324)

ABSTRACT OF THE DISCLOSURE

A display device using electroluminescent display symbols having segments which are selectively energized by a read-write head selectively positioned adjacent to the symbols. The read-write head is provided with radiation emitting means to energize the symbol segments and a radiation detecting means for checking the energized display segments.

Background of the present invention

In the field of data display systems, many display devices have been developed which provide a visible display of information to an operator. These have included photographic projection devices using photographically recorded images projected on a common screen, mechanically stepped number wheels, and edge and backlighted number forming elements. However, all of these prior art devices had a common shortcoming in failing to provide means for a direct computer interconnection to the display panel to enable the computer to read and write on the display panel. Even the recently developed "light pens" which are used by an operator to "write" messages on a special cathode ray tube for use by a computer as input data fail to provide the dual reading and writing function.

An object of the present invention is to provide an improved alphanumeric visual display device.

Another object of the present invention is to provide an improved flat panel alphanumeric visual display device.

A further object of the present invention is provide an improved solid-state display panel having self-storing electroluminescent display symbols.

Still another object of the present invention is to provide an improved display panel including keyboard operated means for writing and reading on the display panel.

A still further object of the present invention is to provide an improved visual display panel having capability for automatic readout of displayed information.

Summary of the invention

In accomplishing these and other objects, there has been provided, in accordance with the present invention, an alphanumeric display device comprising a plurality of display characters having electroluminescent segments which are selectively energized by a write-read head. This head is selectively positioned adjacent to each display character to transfer information from a keyboard to the display panel and to read-out displayed information to associated equipment. The display symbols are self-storing through a latching operation of the electroluminescent segment to an energizing signal source.

Brief description of the drawings

A better understanding of the present invention may be had when the following detailed disclosure is read in connection with the accompanying drawings, in which.

Detailed description

Figure 1:
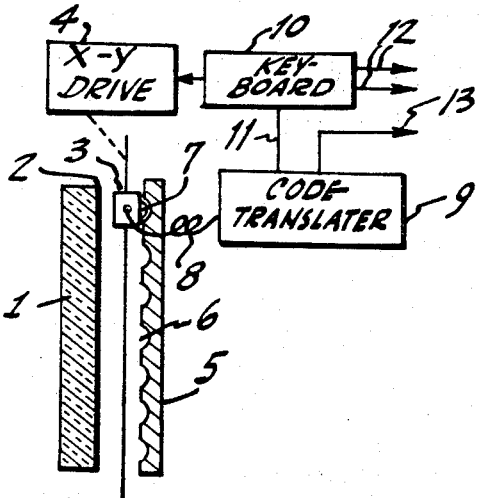
FIGURE 1 is a partial pictorial representation of a display system embodying the present invention.

Referring to FIGURE 1 in more detail, there is shown a flat panel display system embodying the present invention. A transparent front panel 1 is arranged to support individual display characters in a characterized solid-state layer 2 on the back surface of the panel 1, as described hereinafter. A reading and writing head 3 is provided behind the layer 2 and is selectively positioned in a two-coordinate location by an X-Y drive 4. In the present embodiment, the head 3 is supported on a support plate 5 having locating surface indentations 6 arranged to receive a spring loaded ball 7 projecting from an adjacent rear surface of the head 3. The indentations 6 are arranged to fix the head 3 in the positions dictated by the X-Y drive 4.

A connecting cable 8 is arranged to connect the head 3 to a code translator 9. The translator 9 is effective to either provide signals to the head 3 for writing on the display panel or to receive read signals from the head. The drive means 4 and the translator 9 are controlled by an input keyboard 10. The keyboard 10 is arranged to selectively enter new symbols on the display panel over a connecting input line 11 to the translator 9 and to step the X-Y drive 4 to position the head 3 in a new writing position. A cursor for indicating the position of the head 3 to an operator in front of the display panel may be provided by having a small hole through the panel at each character location and an illuminated element on the head 3 arranged to shine through the hole when the head 3 is placed in position by the X-Y drive 4. In addition, the keyboard 10 is effective to erase the display panel by means of an "erase" signal applied over lines 12. Also, the keyboard 10 is arranged to place the X-Y drive in an automatic read condition whereby the head 3 is automatically stepped at high speed over the panel to supply signals to the translator 9. The translator 9, in turn, is arranged to translate these signals to suitable output signals for application to an output line 13 connected to associated equipment, such as a digital computer. The keyboard 10 may be controlled directly in known fashion by the digital computer to effect a display of computer information.

Figure 2:
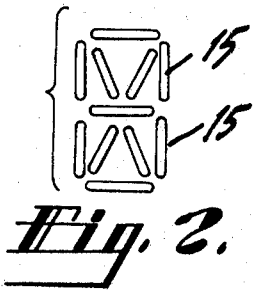
FIGURE 2 is a pictorial view of an alphanumeric display character used with the present invention.

In FIGURE 2, there is shown a typical segmental display symbol suitable for use with the present invention. The symbol comprises a plurality of display segments, or strokes, 15 arranged in a common pattern shared by all the symbols to form characters by the selective illumination of a combination of the segments 15. Such segments may be made from electroluminescent material as described hereinafter.

Figure 3:
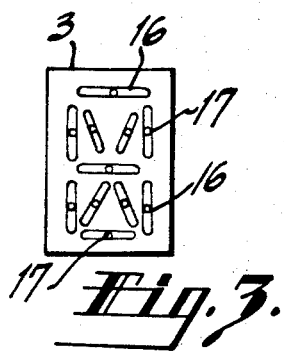
FIGURE 3 is a pictorial front view of an input-output head used with the present invention.

As shown in FIGURE 3, the read-write head 3 comprises a plurality of selectively illuminable segments 16, e.g. electro-luminescent material, arranged in a mating spatial configuration to the segments 15 of the display symbol. It is to be noted that these segments 16 need not have the same geometrical configuration as the segments 15 since it is only necessary for the segments 16 to illuminate the segments 15. These segments 16 of the head 3, also, have individual light sensors 17 arranged in connection but shielded from the light emitted by the head segments 16. Thus, when the head 3 is positioned adjacent to an illuminated display symbol by the drive means 4, the light sensors 17 are effective to respond to radiation from corresponding ones of the display segments 15. The signals from the sensors 17 are a representation of the illuminated segments of a selected display character.

Figure 4:
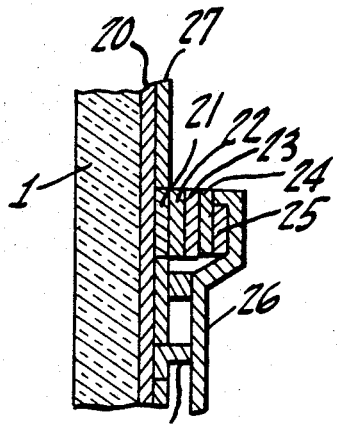
FIGURE 4 is a magnified side view of a portion of a display character used in the present invention.

In FIGURE 4, there is shown a magnified cross-section of a display segment 15. The transparent front panel 1, e.g. glass, is first coated with a transparent conducting layer 20, e.g. tin oxide, commonly referred to as TIC. Next, the segment 15 is deposited as an electroluminescent layer 21 hereinafter referred to as an EL layer. In order to prevent ambient illumination from reaching the rear of the display panel, an opaque conductive layer 22, such as aluminum is deposited on top of the electroluminescent layer 21. A second layer 23 of electroluminescent, i.e. EL, material is then deposited on the conductive layer 22. The second EL layer 23 is then covered with a transparent conductive layer 24 followed by a transparent insulator 25, e.g. silicon oxide. Finally, a coating 26 of photoconductive material is deposited on top of the insulating layer 25 and is electrically connected to other segments to form a combined symbol circuit. The conductive layer 22 serves to shield the photoconductive coating 26 from ambient light while allowing the two EL layers 21 and 23 to function electrically as one element. The back of the transparent conducting layer 20 may be covered with an opaque insulating layer 27, e.g. aluminum oxide. Strips 28 of the same conductive material forming the opaque layer 22 may be deposited to join the photoconductive layers 26 and to provide connections for an energizing signal to the symbols.

Figure 5:
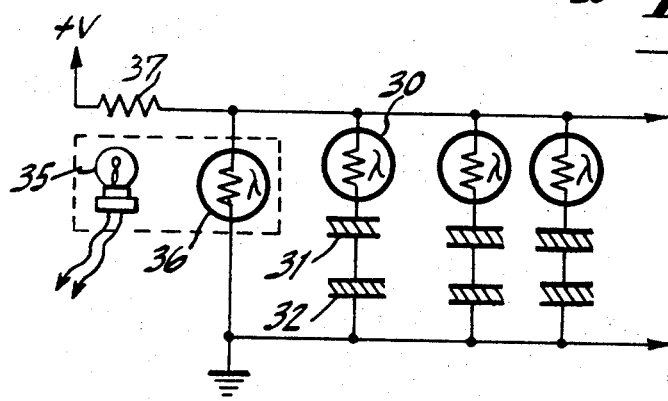
FIGURE 5 is a partial schematic illustration of the display circuit of the present invention.

In FIGURE 5, there is shown an equivalent circuit for the deposited character segments of the present embodiment described above with respect to FIGURE 4. Each segment comprises two EL layers, a photoconductive layer and the interconnecting conductors. Thus, one segment consists of a photoconductive element 30, a first EL element 31, and a second EL element 32. The conductors between these elements and a source +V are formed by the deposited conductors including the transparent conductive layer 20.

In operation, a segment of a symbol is turned "on" by the light from a corresponding "write" segment 16 on the selectively positioned head 3. This light is arranged to lower the impedance of the photoconductive element 30 whereby to apply the voltage from the source +V across the EL elements 31 and 32. The application of a voltage across conductively connected elements 31 and 32 is effective to cause them to operate together to emit light. The first EL element 31 is arranged to illuminate the photocell 30 to retain its low impedance condition whereby to "store" the display character segment. The second EL element 32 is arranged to transmit its light through the front panel 1 and coating 20 as an illuminated segment of a character. Thus, the symbol appearing on the head 3 is reproduced on the display panel by a selective illumination of the segments of a display character. The head 3, of course, is repositioned for each "write" operation by the X–Y drive 4.

The "read" operation is performed by the head 3 by means of the light sensors 17. Since each illuminated symbol has illuminated front and back segments, the head 3 is used to sense which segments are illuminated by successively positioning the head 3 adjacent to each character position in a "scanning" operation. During a "read" scan, the display panel is rapidly scanned by the head 3 and the detected symbol information is transmitted through the code translator 9 to associated equipment.

An "erase" operation may be achieved by having an "erase" lamp 35 arranged to be energized by the keyboard 10 over the line 12. For an "erase" operation of a single character, the lamp 35 is mounted on the head 3 and is positioned adjacent to a photoconductive element 36 separate from the display elements 15 which may, also, be deposited on the display panel. In fact, for convenience of manufacture any resistors, such as resistor 37 used in the display panel circuit may be deposited on the display panel 1 as photoconductive elements and protected from radiation by opaque coatings while having an electrical connection thereto made by the conductive strips 26. The element 36 is connected between the source +V and ground to form a low resistance path when illuminated. This is effective to remove the voltage from the source +V from the other photoconductive elements and the EL elements and to extinguish the illuminated segments. An "erase" operation of the entire panel may be effected in a similar manner using a photoconductive element to short the source +V. It is to be noted that the erase operation may be effected by other means, e.g. a shorting contact on the head 3 for the source +V when the head 3 is driven to an "erase" position.

Accordingly, it may be seen that there has been provided, in accordance with the present invention, a solid-state display panel using electroluminescent symbols with a keyboard operated means for reading and writing on the display panel.

What is claimed is:

1. A display device comprising a plurality of display elements arranged to emit radiation in response to an applied energizing signal, said elements each being arranged as respective segments of a display character, a source of an energizing signal for said elements, a plurality of photo-sensitive elements arranged to connect corresponding ones of said display elements to said source of an energizing signal, each of said photo-sensitive elements being positioned to intercept a portion of the radiation from a corresponding one of said display elements, said photo-sensitive elements having an impedance when illuminated by the radiation from the display elements which is different from the unilluminated impedance exhibited by said photo-sensitive elements, and read-write head means operative to selectively provide radiation emitting sources to affect operatively associated ones of said photo-sensitive elements and having radiation sensitive devices to detect emitted radiation from corresponding ones of said display elements.

2. A display device as set forth in claim 1 wherein said display elements each comprise a pair of serially electrically connected electroluminescent devices arranged to emit radiation in opposite directions and said photo-sensitive elements intercept emitted radiation from a respective one of each of said pair of devices.

3. A display system comprising an array of display characters arranged in rows, a source of an energizing signal, each of said characters comprising a predetermined number of display segments, each of said segments including means operative to emit radiation in response to an applied energizing signal, and a photo-sensitive element arranged to connect said means to said source of an energizing signal and positioned to intercept a portion of the radiation from said means, a read-write head means operative to selectively provide radiation emitting sources to affect selected ones of said segments by means of said photo-sensitive element associated with each of said segments and having radiation-sensitive means to detect emitted radiation from each of said segments of a preselected one of said characters, and drive means operative to selectively position said head adjacent to said characters in response to control signal applied thereto.

4. A display system as set forth in claim 3, wherein said means operative to emit radiation includes a pair of serially electrically connected electroluminescent devices.

5. A display system as set forth in claim 3, wherein said characters have a common pattern of said segments comprising each character and said radiation emitting sources on said head are arranged to cooperate with this common pattern.

6. A display system comprising a plurality of display elements arranged to each emit radiation in response to applied energizing radiation and a read-write head means operative to selectively provide radiation emitting sources to energize respective ones of said elements and having radiation sensitive devices to detect radiation from respective ones of said elements.

7. A display system as set forth in claim 6 wherein each display element includes an electro-luminescent means and a photo-sensitive means.

8. A display system as set forth in claim 6 wherein said display elements are arranged in a predetermined pattern and said sources and said devices in said read-write head are arranged in a pattern substantially identical to said predetermined pattern.

9. A display system as set forth in claim 1 wherein said radiation-emitting sources of said read-write head are arranged in a pattern corresponding to the pattern of said display elements of said display character.

10. A display system as set forth in claim 1 wherein said read-write head means includes means for selectively energizing said radiation emitting sources and receiving signals from said radiation sensitive devices representative of detected radiation from said display elements.

No references cited.

JOHN W. CALDWELL, *Primary Examiner.*

A. J. KASPER, *Assistant Examiner.*